(No Model.)
S. R. SMITH.
DOGGING DEVICE FOR SAW MILL HEAD BLOCKS.
No. 409,516. Patented Aug. 20, 1889.
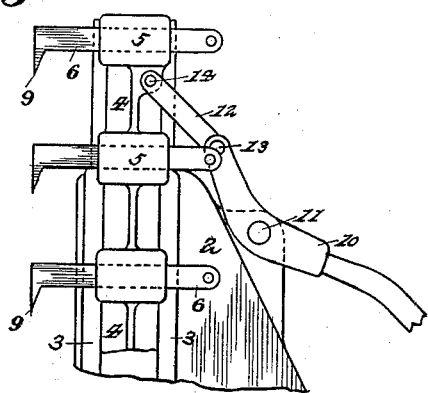
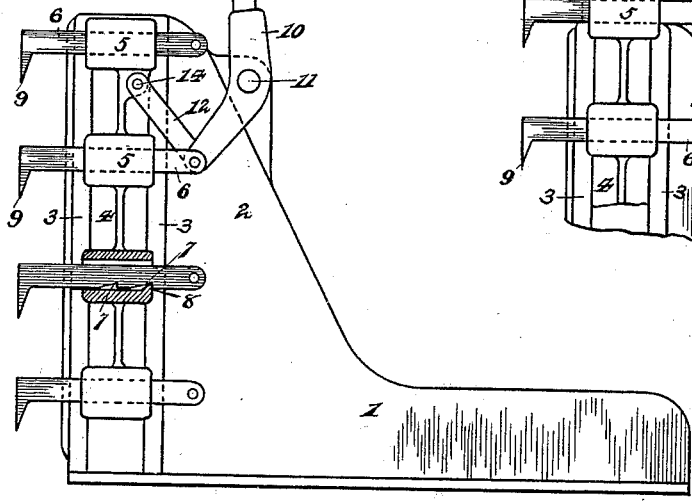
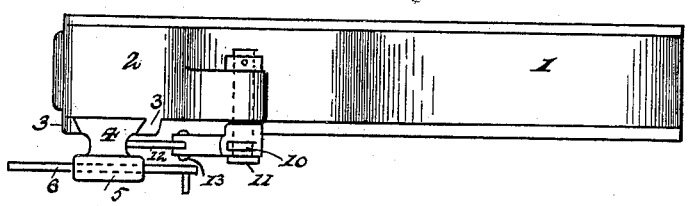
Attest
Wm. F. Ross
T. Simmons
Inventor
Samuel R. Smith
by Wood & Boyd
his Attorneys

UNITED STATES PATENT OFFICE.

SAMUEL R. SMITH, OF CINCINNATI, OHIO, ASSIGNOR TO SMITH, MYERS & SCHNIER, OF SAME PLACE.

DOGGING DEVICE FOR SAW-MILL HEAD-BLOCKS.

SPECIFICATION forming part of Letters Patent No. 409,516, dated August 20, 1889.

Application filed February 9, 1889. Serial No. 298,764. (No model.)

*To all whom it may concern:*

Be it known that I, SAMUEL R. SMITH, a citizen of the United States, and a resident of Cincinnati, in the county of Hamilton and State of Ohio, have invented certain new and useful Improvements in Dogging Devices for Saw-Mill Head-Blocks, of which the following is a specification.

The object of my invention is to provide a novel and simple dogging device which can be locked normally out of position, and when the lock is released the weight of the descending slide will drive the dog into the log to be sawed.

The object of my invention I accomplish by the features of construction and combination of devices hereinafter described and claimed, reference being made to the accompanying drawings, in which—

Figure 1 is a side elevation of my improvement, partly in section. Fig. 2 is a sectional elevation of the same, showing the lifting-lever in a locked position. Fig. 3 is a top plan view of Fig. 1.

1 represents the head-block of the saw-mill carriage. 2 represents the upright portion of it, to which are attached ways 3. These are made dovetailed, so as to receive the dogging-slide 4, the edges of which are shaped to fit the dovetail in the ways 3. To the slide 4 are rigidly attached housings 5.

6 represents dogging-arms which pass through the openings in the housings. They are each provided, preferably, with two notches 7, that engage with the catch 8, preferably formed at the rear in the bottom of the housings. The openings in the housings are fitted to allow the dogging 6 to be lifted up and slide backward and forward to engage them in any particular notch. The ends of the dogs are provided with hooked points 9, so as to allow them to be readily driven into the logs.

10 represents a lever pivoted on its center 11 to the frame of the head-block.

12 represents a link hinged by center 13 to the lever 10, and by center 14 to the slide 4. This link 12 and lever 10 form a lock-lever when thrown into position shown in Fig. 2, the center 13 being out from a line drawn from the center 11 through center 14, thus locking the slide 4 up and holding it out of engagement. When it is desired to dog the logs, the lever is lifted to release the lock, and the slide 4 is allowed to descend, its weight forcing the sharp point 9 in the log.

I have shown four dogs in lines one above the other, so as to adapt the dogging mechanism to whatever size of logs are to be sawed. By having the housings 5 rigidly attached to or formed as immovable portions of the dogging-slide, the dogs rise and fall in unison with the slide, while by pivoting the lever 10 to the head-block on which the slide moves the slide can be raised by the lever and locked by the latter in an elevated position.

Having described my invention, what I claim is—

The combination, with a head-block having a vertically-arranged guideway, and a vertically-movable slide having a housing containing the dog and adapted to said guideway, of a lock-lever pivoted intermediate its ends directly to the head-block, and a link pivoted at its lower extremity to the inner end of the lever at one side the pivot thereof, and rising therefrom and having its upper extremity pivoted directly to the slide to lock the same in its elevated position when the lever is depressed to raise its inner end above its pivot-point, substantially as described.

In testimony whereof I have hereunto set my hand.

SAMUEL R. SMITH.

Witnesses:
 WM. E. BROOKS,
 J. WATSON SIMS.